US009132548B2

(12) United States Patent
Kamiya et al.

(10) Patent No.: US 9,132,548 B2
(45) Date of Patent: Sep. 15, 2015

(54) ROBOT PICKING SYSTEM, CONTROL DEVICE AND METHOD OF MANUFACTURING A WORKPIECE

(71) Applicant: KABUSHIKI KAISHA YASKAWA DENKI, Kitakyushu-shi (JP)

(72) Inventors: Yosuke Kamiya, Fukuoka (JP); Shingo Ando, Fukuoka (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 0 days.

(21) Appl. No.: 14/181,727

(22) Filed: Feb. 17, 2014

(65) Prior Publication Data
US 2014/0277719 A1 Sep. 18, 2014

(30) Foreign Application Priority Data

Mar. 18, 2013 (JP) ................................. 2013-055225

(51) Int. Cl.
G05B 19/04 (2006.01)
G05B 19/18 (2006.01)
B25J 9/16 (2006.01)

(52) U.S. Cl.
CPC ..... *B25J 9/1669* (2013.01); *G05B 2219/40053* (2013.01)

(58) Field of Classification Search
CPC .......... B25J 9/1697; B25J 9/1669; B25J 9/16; G05B 2219/40053
USPC ......... 700/245, 250, 251, 253, 254, 255, 258, 700/259; 318/568.11, 568.12, 568.13, 318/568.16, 568.18, 568.19, 568.21, 568.22
See application file for complete search history.

(56) References Cited

U.S. PATENT DOCUMENTS

| 5,446,835 | A | * | 8/1995 | Iida et al. ...................... 700/259 |
| 6,328,523 | B1 | * | 12/2001 | Watanabe et al. ......... 414/416.01 |
| 7,123,992 | B2 | * | 10/2006 | Ban et al. ...................... 700/258 |
| 7,313,464 | B1 | * | 12/2007 | Perreault et al. .............. 700/245 |
| 7,996,114 | B2 | * | 8/2011 | Ban et al. ...................... 700/259 |
| 8,098,928 | B2 | * | 1/2012 | Ban et al. ...................... 382/153 |

(Continued)

FOREIGN PATENT DOCUMENTS

| CN | 101402199 | 4/2009 |
| CN | 102642201 | 8/2012 |

(Continued)

OTHER PUBLICATIONS

Rolf Dieter Schraft and Thomas Ledermann, Intelligent picking of chaotically stored objects, 2003, Emerald Insight, Assembly Automation, vol. 23 o No. 1 o 2003 o pp. 38-42.*

(Continued)

*Primary Examiner* — Dalena Tran
*Assistant Examiner* — Jaime Figueroa
(74) *Attorney, Agent, or Firm* — Mori & Ward, LLP

(57) ABSTRACT

A robot picking system includes a robot including a gripper that picks up a target work in a first stocker accommodating a plurality of works, a control device that controls an operation of the robot, and an image acquiring device that acquires image data including information related to the target work. The control device includes a trajectory calculating unit that sets a first trajectory including a first zone in which a posture of the gripper is changed and a second zone in which the gripper having the changed posture approaches the target work that is a picking-up target.

20 Claims, 10 Drawing Sheets

(56) References Cited

U.S. PATENT DOCUMENTS

| | | |
|---|---|---|
| 8,559,699 B2* | 10/2013 | Boca .............................. 382/153 |
| 2005/0075752 A1* | 4/2005 | Ban et al. ...................... 700/213 |
| 2006/0111811 A1* | 5/2006 | Okamoto et al. ............. 700/214 |
| 2006/0111812 A1* | 5/2006 | Okamoto et al. ............. 700/214 |
| 2006/0112034 A1* | 5/2006 | Okamoto et al. ............... 706/16 |
| 2006/0116973 A1* | 6/2006 | Okamoto et al. ............... 706/16 |
| 2006/0184279 A1* | 8/2006 | Okamoto et al. ............. 700/245 |
| 2007/0274812 A1* | 11/2007 | Ban et al. ...................... 414/217 |
| 2007/0282485 A1* | 12/2007 | Nagatsuka et al. ........... 700/245 |
| 2008/0009972 A1* | 1/2008 | Nihei et al. ................... 700/245 |
| 2010/0324737 A1* | 12/2010 | Handa et al. .................. 700/259 |
| 2011/0122231 A1* | 5/2011 | Fujieda et al. .................. 348/47 |
| 2012/0215350 A1 | 8/2012 | Murayama et al. |
| 2012/0296469 A1* | 11/2012 | Yoshinaga et al. ............ 700/218 |
| 2013/0211593 A1 | 8/2013 | Domae et al. |

FOREIGN PATENT DOCUMENTS

| | | |
|---|---|---|
| CN | 102806555 | 12/2012 |
| JP | 2011-042011 | 3/2011 |
| JP | 2011-093015 | 5/2011 |
| JP | 2012-240166 | 12/2012 |
| WO | WO 2012/066819 | 5/2012 |

OTHER PUBLICATIONS

Henrik Saldner, PalletPicker-3D: the solution for picking of randomly placed parts, 2003, Emerald Insight, Assembly Automation, vol. 23 o No. 1 o 2003 o pp. 29-31.*

European Patent Office Communication for corresponding EP Application No. 14153403.2-1807, Sep. 29, 2014.

Extended European Search Report for corresponding EP Application No. 14153403.2-1807, Aug. 19, 2014.

Japanese Office Action for corresponding JP Application No. 2013-055225, Sep. 24, 2014.

Chinese Office Action for corresponding CN Application No. 201410062129.5, Jun. 3, 2015.

* cited by examiner

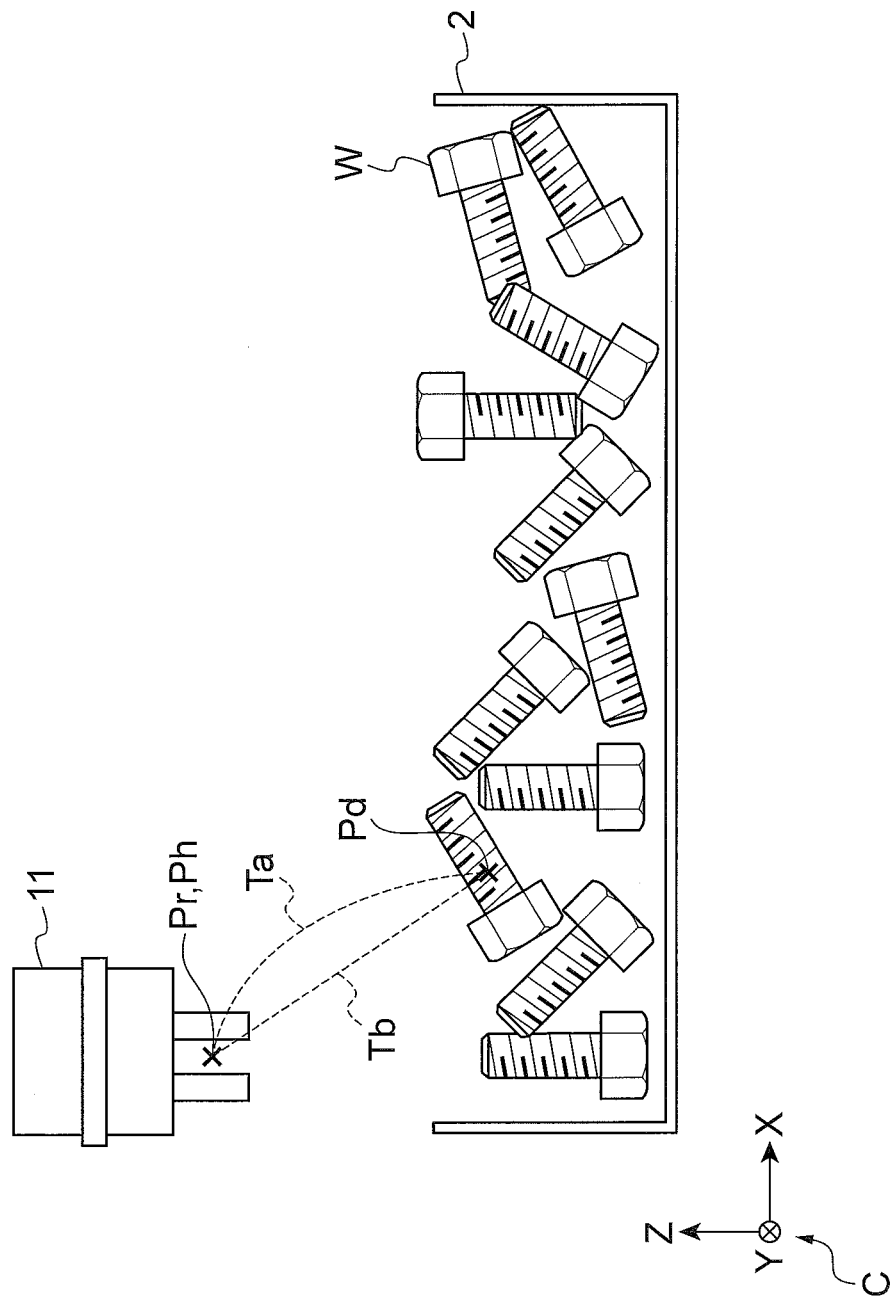

ROBOT PICKING SYSTEM, CONTROL DEVICE AND METHOD OF MANUFACTURING A WORKPIECE

CROSS-REFERENCE TO RELATED APPLICATION

This application is based upon and claims the benefit of priority from Japanese Patent Application No. 2013-055225, filed Mar. 18, 2013, the entire contents of which are incorporated herein by reference.

BACKGROUND

1. Field

The present disclosure relates to a robot picking system, a control device and a method of manufacturing a workpiece.

2. Description of the Related Art

There is a picking technique of taking out a corresponding work from a stocker in which works having the same shape such as bolts are randomly accommodated and holding the corresponding work. A robot picking system using a picking technique is disclosed in JP 2012-240166 A. In this robot picking system, first of all, an adsorption nozzle holding a target work is moved to a certain position. Then, after suction of the adsorption nozzle starts, the adsorption nozzle is moved toward a target work.

SUMMARY

In order to solve the above problem, a robot picking system according to the present disclosure includes a robot including a picking-up unit that picks up a work in a stocker accommodating a plurality of works, a control device that controls an operation of the robot, and an image acquiring device that acquires image data including information related to the plurality of works, wherein the control device includes a trajectory data generating unit that generates a first trajectory including a first zone in which a posture of the picking-up unit is changed and a second zone in which the picking-up unit having the changed posture approaches a target work that is a picking-up target.

BRIEF DESCRIPTION OF THE DRAWINGS

FIG. 6 is a diagram for describing a method of calculating a trajectory;

DETAILED DESCRIPTION

Figure 1:
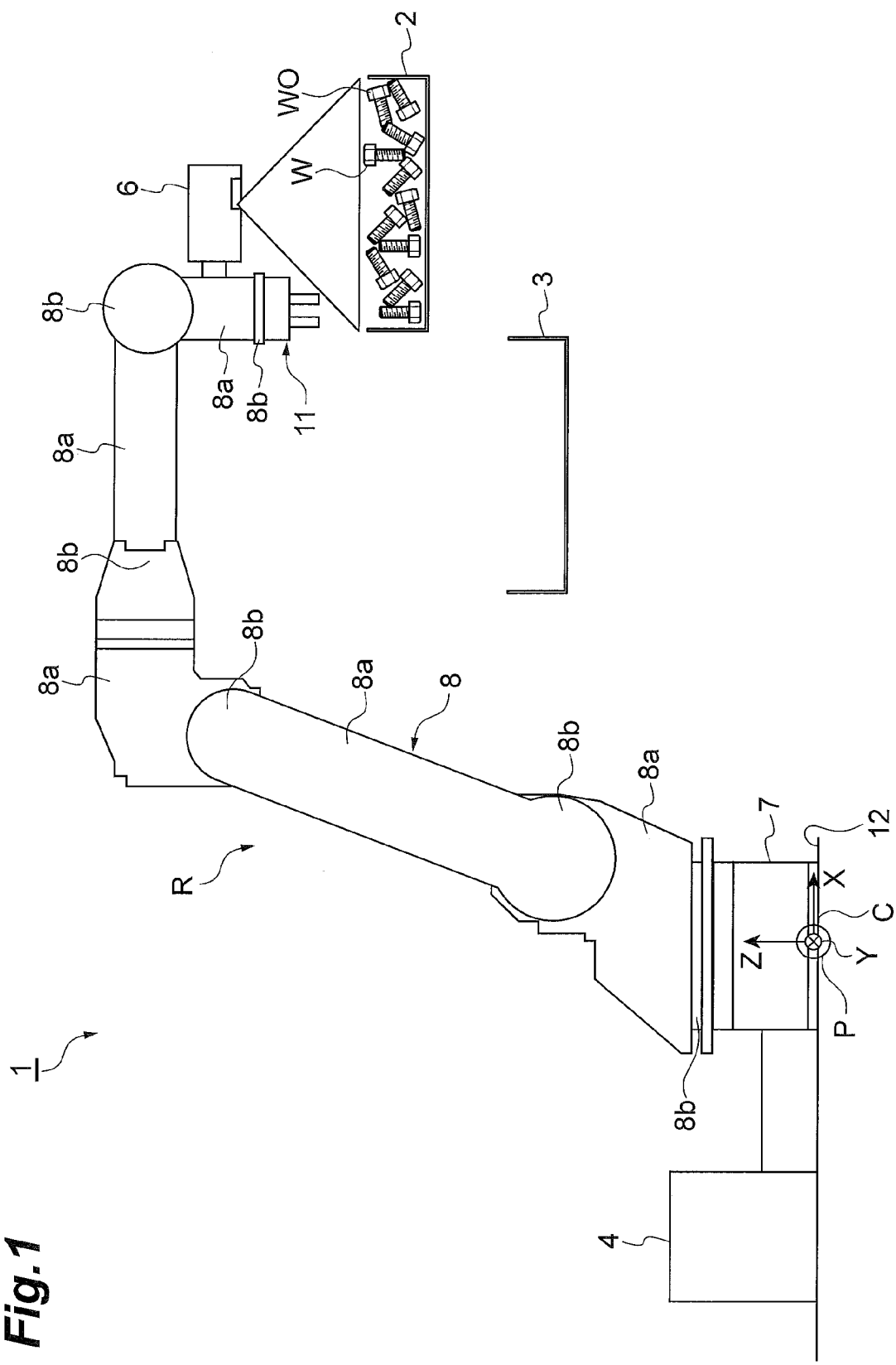
FIG. 1 is a diagram illustrating a robot picking system according to the present embodiment.

Hereinafter, a plurality of embodiments of a robot picking system, a control device and a method of manufacturing a workpiece will be described in detail with reference to the appended drawings. Note that, in the description of the drawings, the same structural elements are denoted with the same reference numerals, and repeated explanation of these structural elements is omitted.

<Robot Picking System>

Figure 2:
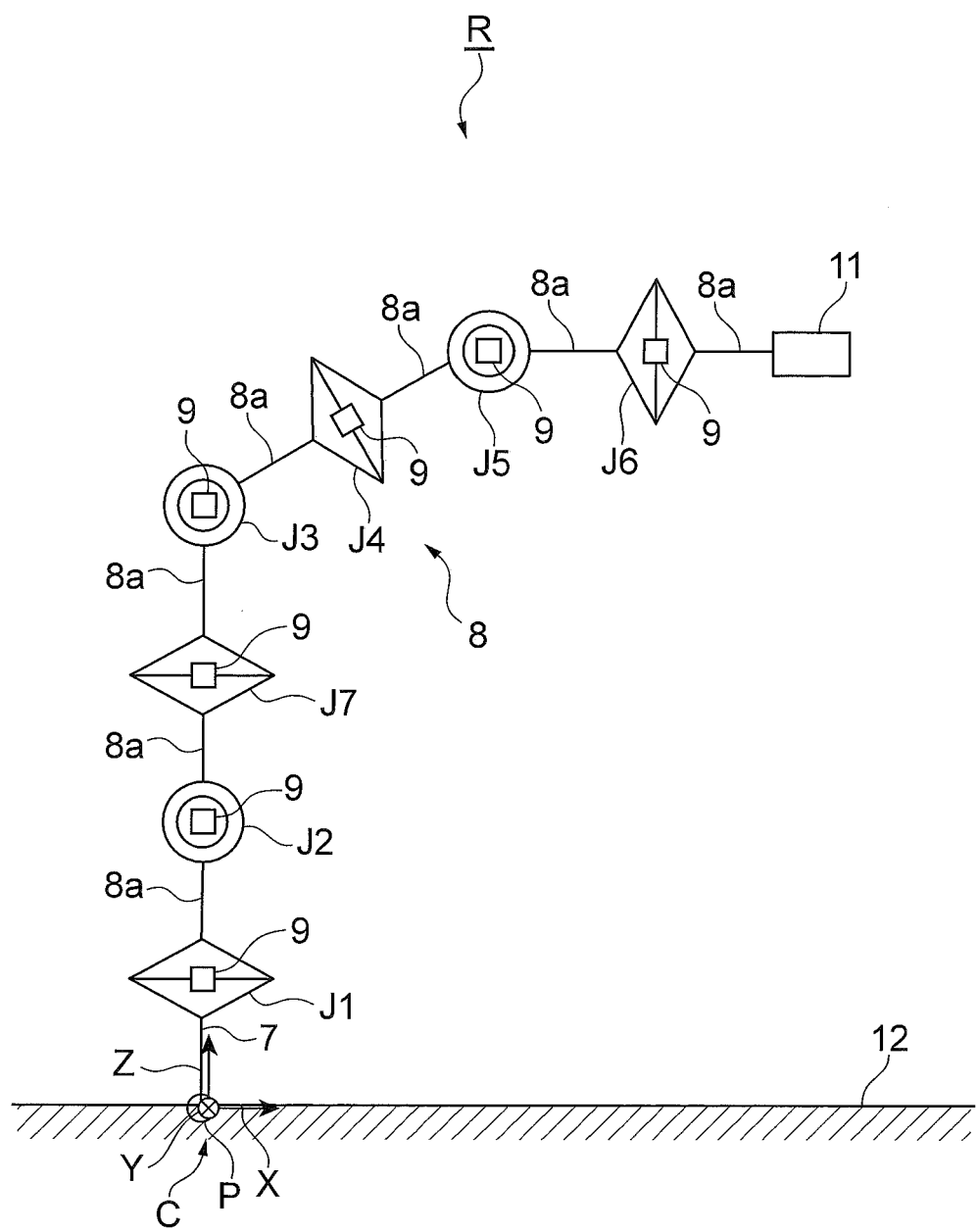
FIG. 2 is a diagram for describing a robot.

FIG. 1 is a diagram illustrating a robot picking system 1 according to the present embodiment. FIG. 2 is a diagram illustrating a mechanism of a robot R illustrated in FIG. 1. As illustrated in FIG. 1, the robot picking system 1 picks up (takes out) works W in a first stocker (container) 2 one by one and transfers the works W to a second stocker (container) 3. The first stocker 2 is a container made of resin or metal, and a plurality of works W in bulk are accommodated in the first stocker 2. The works W accommodated in the first stocker 2 are parts having the same shape such as bolts. The work W picked up from the first stocker 2 is accommodated in the second stocker 3, for example, according to a predetermined arrangement or posture.

The robot picking system 1 includes the robot R that picks up the work W from the first stocker 2 and transfers the work W to the second stocker 3, a control device 4 that controls an operation of the robot R, and an image acquiring device 6 that acquires an image included in image data of the work W.

<Robot>

FIG. 2 is a diagram for describing the robot R. As illustrated in FIG. 2, the robot R is a so-called multi joint robot, and includes a base 7, an arm 8, and a gripper (robot end effector) 11 serving as a picking-up unit. The base 7 is the foundation of the robot R and fixed to a floor 12. The arm 8 includes a plurality of arm sections 8a and a plurality of rotational joints J1 to J7 that connect the arm sections 8a. Thus, the robot R has a 7-degree-of-freedom constitution in which a redundant degree of freedom is added to a 6-degree-of-freedom constitution necessary for operation in a three-dimensional space. However, a robot to which the robot picking system of the present disclosure is applied is not limited to the 7-degree-of freedom mechanism and can be applied to a 6-degree-of freedom mechanism or any other mechanism regardless of an axial constitution. A servomotor (not shown) for rotationally driving the rotational joints J1 to J7 is mounted in the arm section 8a, and the arm section 8a is controlled by a control signal input from the control device 4. Further, a sensor 9 for detecting a rotational angle is mounted in each of the rotational joints J1 to J7. The sensor 9 outputs a detected angle value to the control device 4 as sensor data (see FIG. 4). The gripper 11 is mounted to the leading end of the arm 8 of the robot R. The gripper 11 causes a pair of members to perform an opening/closing operation and holds the work W. The opening/closing operation of the gripper 11 is controlled by a control signal input from the control device 4.

A robot coordinate system C is set to the robot R. For example, in the robot coordinate system C, a direction vertical to the floor 12 on which the robot R is arranged is referred to as a Z direction, and a direction parallel to the floor 12 is referred to as an X direction. Further, a direction (a direction vertical to a plane of paper) perpendicular to the X direction and the Z direction is referred to as a Y direction. For example, a point at which the robot R is fixed to the floor 12 is referred to as a fixed point P, and the fixed point P is used as an original point of the robot coordinate system C.

<Image Acquiring Device>

The image acquiring device 6 acquires image data including information related to the work W, and outputs the image data to the control device 4. The image data includes image information including imaging data of a plurality of works W in the first stocker 2 and distance information of an object shown in an image. As the image acquiring device 6 capable of acquiring image data, for example, a stereo camera, a distance image sensor or a device in which an image sensor is combined with a range-finding sensor may be used.

<Control Device>

The control device 4 generates first trajectory data and second trajectory data using angular data, image data, link information related to the robot R, or the like. The control device 4 operates the robot R using the first trajectory data and the second trajectory data such that a target work WO is picked up and transferred from the first stocker 2 to the second stocker 3.

Figure 3:
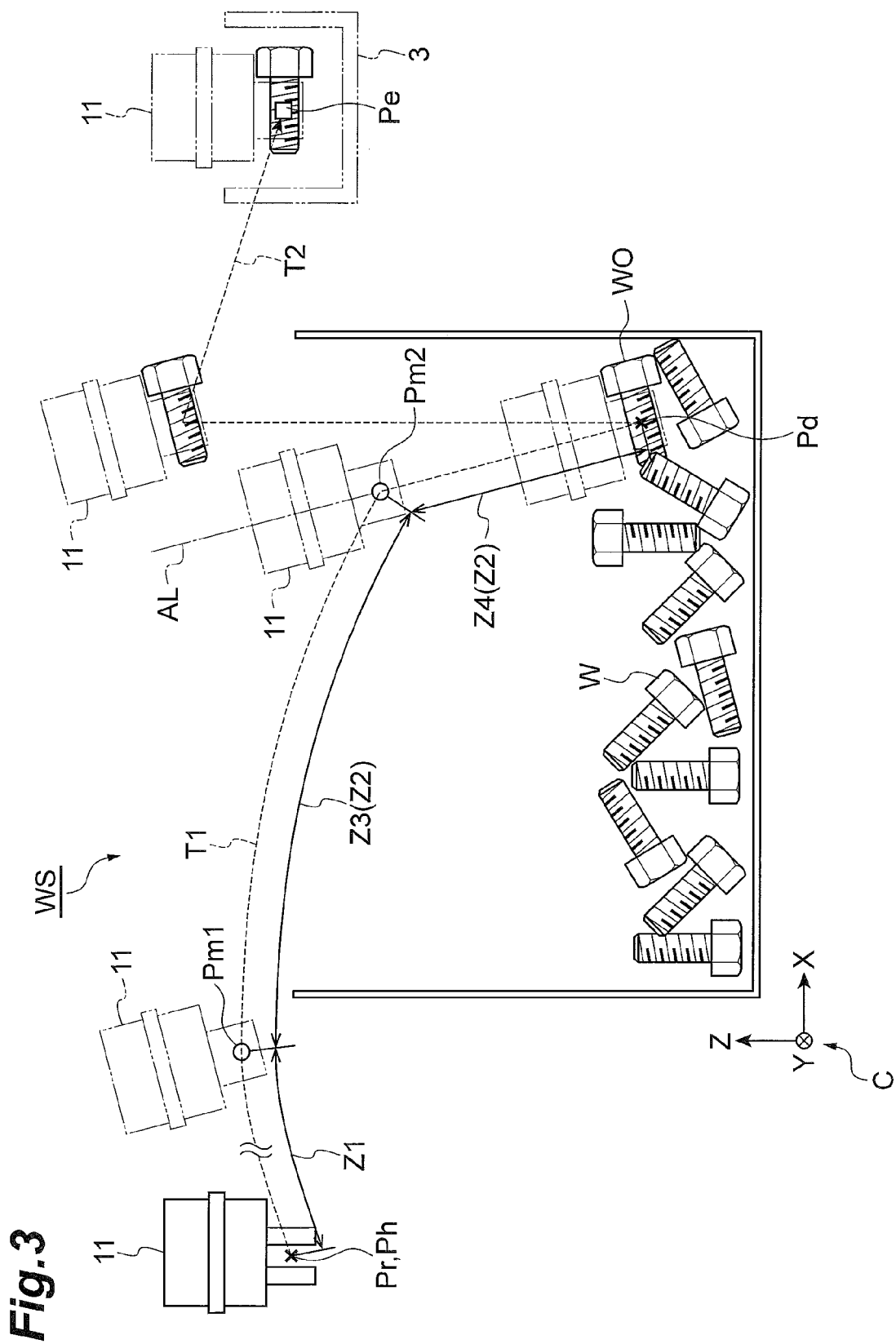
FIG. 3 is a diagram for describing first trajectory data and second trajectory data.

FIG. 3 is a diagram for describing the first trajectory data and the second trajectory data. The first trajectory data and the second trajectory data include information representing the trajectory in which the gripper 11 moves between certain two points and information related to the posture of the gripper 11 while on the move. As illustrated in FIG. 3, an example in which the gripper 11 located at a start point Pr picks up the target work WO positioned at a target point Pd, and transfers the target work WO to an end point Pe in a work space WS will be described as an example of the picking-up operation. The work space WS is specified by the robot coordinate system C.

A representative point Ph representing the position of the gripper 11 is set to the gripper 11. The first trajectory and the second trajectory are a moving trajectory of the representative point Ph. The position of the target work WO is represented by the target point Pd set to the work space WS. The target point Pd is a point that is set for each target work WO in the work space WS based on the robot coordinate system C. When the target work WO is picked up, the representative point Ph of the gripper 11 overlaps the target point Pd of the target work WO. The start point Pr at which the representative point Ph is present when the picking-up operation starts, and the end point Pe representing the transfer destination of the target work WO are set to the work space WS. For example, the end point Pe is set to the inside of the second stocker 3.

A first trajectory T1 is a moving path of the representative point Ph of the gripper 11 from the start point Pr to the target point Pd, and is a zone in which the posture of the gripper 11 is changed to the picking-up posture. The first trajectory T1 includes a first zone Z1 and a second zone Z2 divided by a first intermediate point (intermediate point) Pm1. In other words, the first intermediate point Pm1 divides the first trajectory T1 into the first zone Z1 and the second zone Z2. The first zone Z1 is a zone extending from the start point Pr to the first intermediate point Pm1. In the first zone Z1, the representative point Ph of the gripper 11 moves from the start point Pr to the first intermediate point Pm1, and the posture of the gripper 11 is changed from an initial posture to the picking-up posture. The initial posture refers to the posture in which the gripper 11 starts the picking-up operation, and is, for example, the posture of the gripper 11 at the start point Pr. The first intermediate point Pm1 is set above the target work WO outside the first stocker 2 so that the distance of the first zone Z1 is larger than the distance of the second zone Z2.

The second zone Z2 is the moving path of the representative point Ph of the gripper 11 from the first intermediate point Pm1 to the target point Pd, and is a zone in which the gripper 11 changed to the picking-up posture in the first zone Z1 approaches the target work WO. In the second zone Z2, the posture of the gripper 11 is held in the picking-up posture, and the representative point Ph of the gripper 11 moves from the first intermediate point Pm1 to the target point Pd. The second zone Z2 includes a third zone Z3 continued from the first trajectory T1 via the first intermediate point Pm1 and a fourth zone Z4 continued from the third zone Z3 via a second intermediate point Pm2, and the third zone Z3 and the fourth zone Z4 are divided by the second intermediate point Pm2. The second intermediate point Pm2 is a point set on an extension line extending from the target point Pd in an approach direction AL. The third zone Z3 is a zone in which the gripper 11 moves from the first intermediate point Pm1 to the second intermediate point Pm2 with the shortest distance while avoiding an obstacle. The fourth zone Z4 is a zone in which the gripper 11 moves in the approach direction AL from the second intermediate point Pm2 to the target point Pd.

A second trajectory T2 is the moving path of the gripper 11 from the target point Pd to the end point Pe. In the second trajectory T2, the gripper 11 holding the target work WO moves from the target point Pd to the end point Pe without being interfered with an obstacle. The end point Pe is a point representing the position of the transfer destination of the target work WO.

Figure 4:
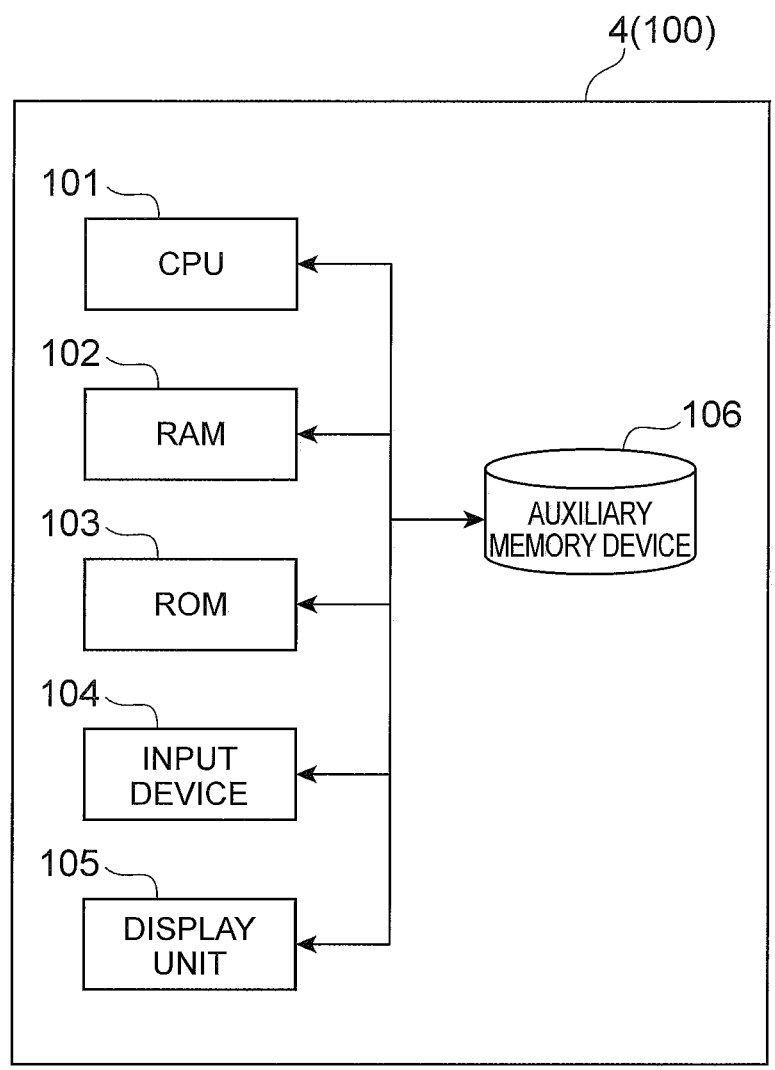
FIG. 4 is a diagram for describing a computer implementing a control device.
Figure 5:
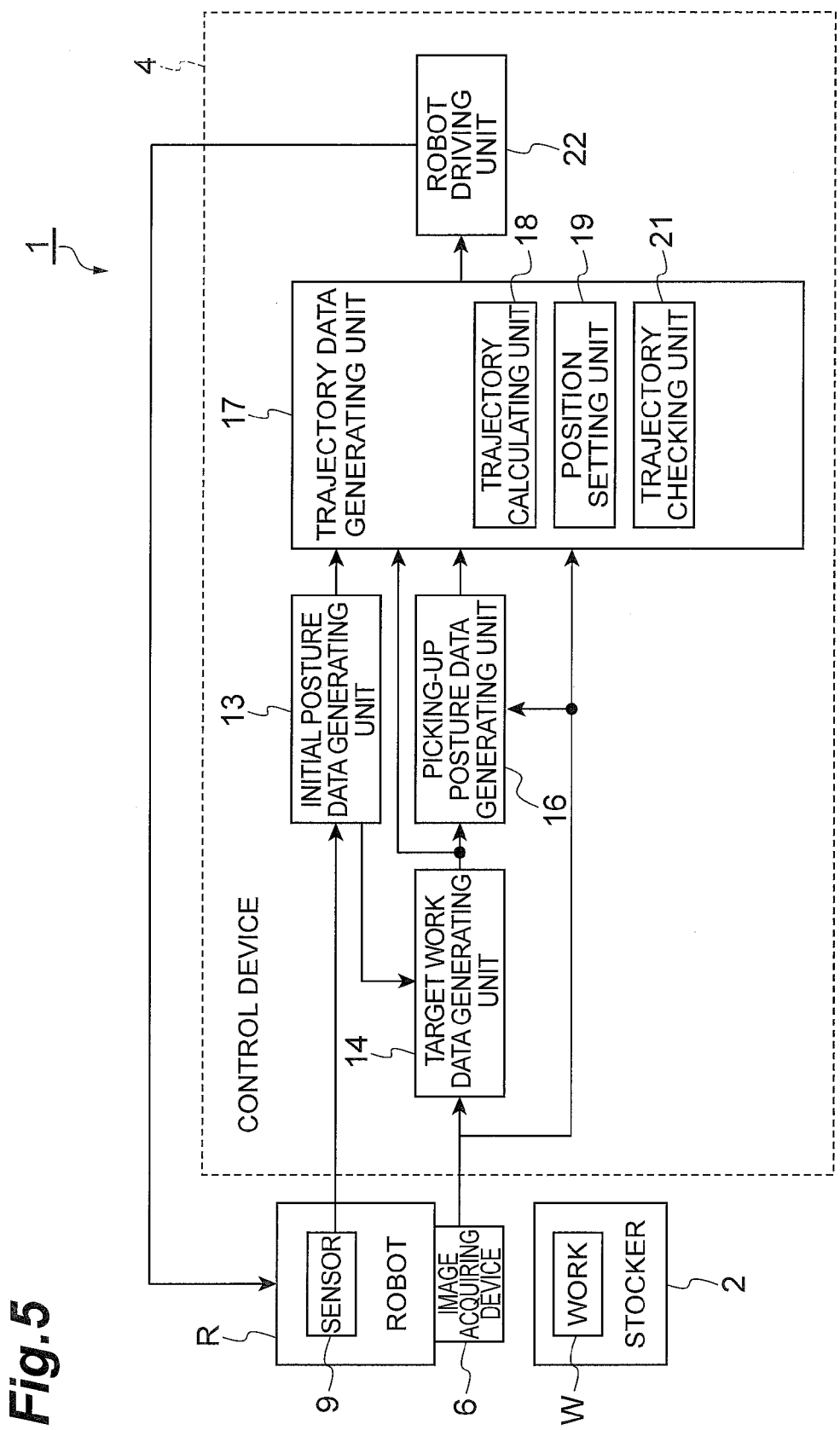
FIG. 5 is a functional block diagram of the control device.

The control device 4 outputs the control signal to the robot R, and controls an operation of the robot R. The control device 4 is configured with a computer that is connected to be able to perform communication with the robot R. FIG. 4 is a diagram for describing a computer 100 configured to implement the control device 4. FIG. 5 is a functional block diagram of the control device 4. As illustrated in FIG. 4, the computer 100 is an example of hardware configuring the control device 4 of the present embodiment. The computer 100 includes an information processing device such as a person computer that includes a central processing unit (CPU) and performs processing or control by software. The computer 100 is configured as a computer system that includes a CPU 101, a random access memory (RAM) 102 and a read only memory (ROM) 103 which are main memory devices, an input device 104 such as a keyboard, a mouse, and a programming pedant, a display unit 105 such as a display, an auxiliary memory device 106 such as a hard disk, and the like. The functional structural elements illustrated in FIG. 5 are implemented such that certain computer software is read out to hardware such as the CPU 101 and the RAM 102, the input device 104 and the display unit 105 are operated under control of the CPU 101, and data is read from or written in the RAM 102 or the auxiliary memory device 106.

As illustrated in FIG. 5, angular data and image data are input to the control device 4 from the sensor 9 and the image acquiring device 6, respectively. The control device 4 includes an initial posture data generating unit 13, a target work data generating unit 14, a picking-up posture data generating unit 16, and a trajectory data generating unit 17.

<Initial Posture Data Generating Unit>

The angular data is input to the initial posture data generating unit 13 from a plurality of the sensors 9. The initial posture data generating unit 13 generates initial posture data which will be described below, and then outputs the initial posture data to the target work data generating unit 14 and the trajectory data generating unit 17. Here, the initial posture data refers to data including information of links L1 to L5 of the robot R and the posture of the gripper 11 in the initial state and coordinate information representing the position thereof. The posture and the position are specified by the robot coordinate system C. The initial posture data generating unit 13 calculates the initial posture data by a calculation based on the forward kinematics using the angular data and the information of the links L1 to L5 of the robot R.

<Target Work Data Generating Unit>

The image data and the initial posture data are input to the target work data generating unit 14 from the image acquiring device 6 and the initial posture data generating unit 13, respectively. The target work data generating unit 14 generates target work data using the image data and the initial posture data, and then outputs the target work data to the picking-up posture data generating unit 16 and the trajectory data generating unit 17. Here, the target work data is data including information specifying a target work serving as a picking-up target among the plurality of works W accommodated in the first stocker 2. For example, the target work may be selected based on the distance between the gripper 11 and the work W. Alternatively, the target work may be selected using a required time necessary until the gripper 11 reaches the respective works W from the initial position and the initial posture thereof using information of the initial posture of the gripper 11 included in the initial posture data.

<Picking-Up Posture Data Generating Unit>

The image data and the target work data are input to the picking-up posture data generating unit 16 from the image acquiring device 6 and the target work data generating unit 14, respectively. The picking-up posture data generating unit 16 generates picking-up posture data which will be described below using the image data and the target work data, and then outputs the picking-up posture data to the trajectory data generating unit 17. The picking-up posture data is data for setting the state of the gripper 11 when picking up the target work WO. The picking-up posture data includes coordinates of the target point Pd representing the position of the target work WO, the picking-up posture of the gripper 11 for picking up the target work WO, and information of the approach direction AL (see FIG. 9A) representing a direction in which the gripper 11 approaches the target work WO. The target point Pd is set to the target work WO specified by the target work data based on the robot coordinate system C by a known method using the image data including the distance information. The picking-up posture of the gripper 11 is calculated using the shape information of the target work WO. The approach direction AL of the gripper 11 is calculated using the shape information of the target work WO and the shape information of the other works W around the target work WO.

<Trajectory Data Generating Unit>

The trajectory data generating unit 17 includes a trajectory calculating unit 18, a position setting unit 19, and a trajectory checking unit 21. The image data, the target work data, the initial posture data, and the picking-up posture data are input to the trajectory data generating unit 17 from the image acquiring device 6, the target work data generating unit 14, the initial posture data generating unit 13, and the picking-up posture data generating unit 16, respectively. The trajectory data generating unit 17 generates second trajectory data using the above data, and outputs the data to a robot driving unit 22. The second trajectory data includes the first trajectory data including information of the first trajectory T1 connecting the start point Pr with the target point Pd and information of the second trajectory T2 connecting the position (the target point Pd) at which the target work WO is picked up with the end point Pe.

<Trajectory Calculating Unit>

The trajectory calculating unit 18 generates trajectory data including moving information of the gripper 11 between two points. The trajectory data includes information related to the moving trajectory between two points and information related to the posture between two points. The trajectory calculating unit 18 generates the first trajectory T1 and the second trajectory T2. Further, the trajectory calculating unit 18 revises the first trajectory T1 and the second trajectory T2 as necessary in order to avoid interference with a surrounding obstacle. A known method may be used as a method of calculating the trajectory avoiding interference.

The first trajectory T1 is calculated using coordinate information of the start point (initial position) Pr, the second intermediate point Pm2, and the target point Pd. The first trajectory T1 is calculated such that the trajectory between the zones (the first zone Z1 and the third zone Z3) from the start point Pr to the second intermediate point Pm2 is calculated, the trajectory of the zone (the fourth zone Z4) from the second intermediate point Pm2 to the target point is calculated, and the two trajectories are connected. Since the zone from the start point Pr to the second intermediate point Pm2 is a zone extending the outside of the first stocker 2 to the inside thereof, for example, a straight line-like trajectory, a curved line-like trajectory, or a trajectory in which a straight line and a curved line are combined is set to avoid interference with a sidewall of the first stocker 2. Further, in the zone (the fourth zone) from the second intermediate point Pm2 to the target point Pd, the gripper 11 moves along the approach direction AL, and thus a straight line-like trajectory is calculated.

Further, the trajectory calculating unit 18 adds information representing that the posture of the gripper 11 at the start point Pr is the initial posture and the posture of the gripper 11 at the first intermediate point Pm1, the second intermediate point, or the target point Pd is the picking-up posture to the first trajectory data.

The second trajectory T2 is calculated using the coordinate information of the target point Pd and the end point Pe. The second trajectory T2 is the trajectory extending to the outside of the first stocker 2 from the inside thereof, and thus a straight line-like trajectory, a curved line-like trajectory, or a trajectory in which a straight line and a curved line are combined is set to avoid interference with the sidewall of the first stocker 2. Further, the trajectory calculating unit 18 adds information representing that the posture of the gripper 11 at the target point Pd is the picking-up posture and the posture of the gripper 11 at the end point is an ending posture to the second trajectory data. Here, the ending posture refers to the posture of the gripper 11 in which the target work WO is released. For example, the ending posture is set based on an arrangement and the posture of the work in the second stocker 3.

Here, a concrete example of a technique of generating the trajectory interpolating between two points will be described. FIG. 6 and FIGS. 7A to 7C are diagrams for describing a trajectory generating technique. Examples of the trajectory generating technique include a trajectory generating technique based on a joint space and a trajectory generating technique based on an orthogonal space.

Figure 7A:
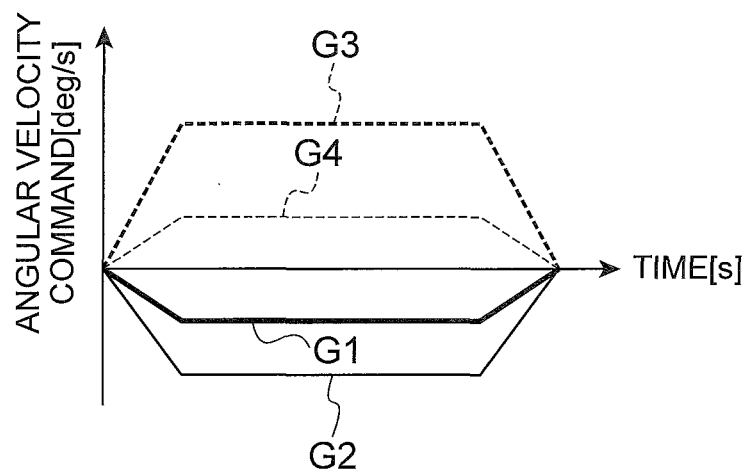
FIGS. 7A to 7C are diagrams for describing a method of calculating a trajectory.

A technique of generating a trajectory Ta based on the joint space as illustrated in FIG. 6 will be described. Here, the joint space refers to a space formed by active joint vectors. In the interpolation method based on the joint space, angular velocity commands of the rotational joints J1 to J7 are generated based on the difference between the joint angle of the robot R at the initial point Pr and the joint angle of the robot R at the target point Pd. In other words, the angular velocity commands of the rotational joints J1 to J7 are generated based on the distance from the start point Pr to the target point Pd1 and a predetermined angular velocity. FIG. 7A is exemplary angular velocity commands applied to the rotational joints J1 to J7. G1 is an angular velocity command applied to the rotational joint J2, G2 is an angular velocity command applied to the rotational joint J3, G3 is an angular velocity command applied to the rotational joint J5, and G4 is an angular velocity command applied to the rotational joint J6. The angular velocity commands are generated so that the angular velocities of the rotational joints J2, J3, J5, and J6 of the robot R have a constant value except when an operation starts or ends as illustrated in FIG. 7A. The exemplary angular velocity commands illustrated in FIG. 7A are generated under the assumption of an operation on the XZ plane in the robot coordinate system C. Thus, the angular velocities of the rotational joints J1, J4, and J7 that operate the arm 8 in the Y direction are set to zero (0).

Figure 7B:
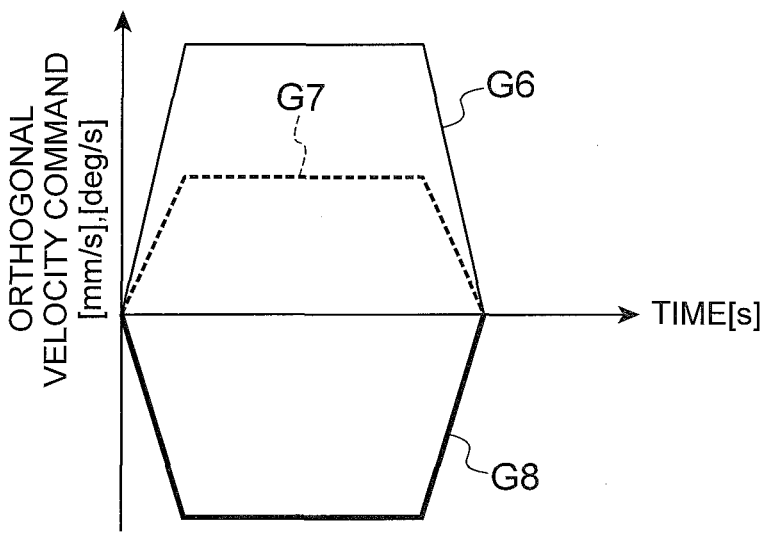
Figure 7C:
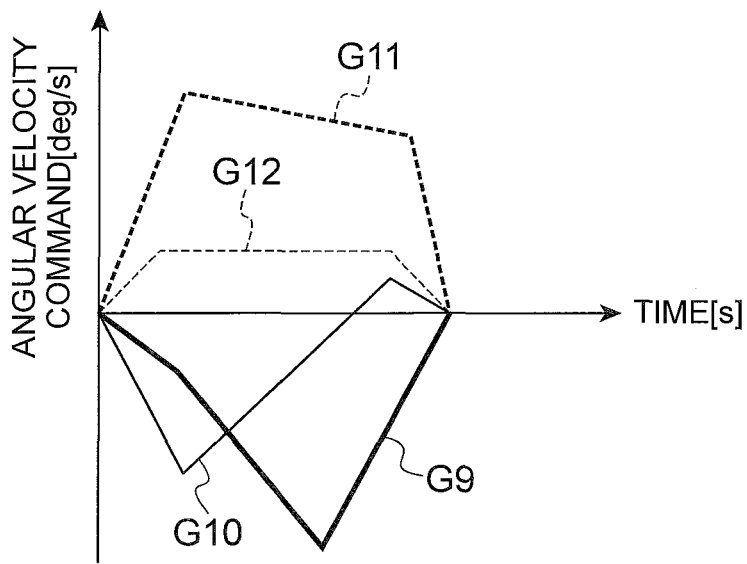

Further, a method of generating a trajectory Tb based on the orthogonal space will be described. In the interpolation method based on the orthogonal space, orthogonal velocity commands of translation velocities in the X axis direction and the Z axis direction and a rotation velocity around the Z axis in the robot coordinate system C are generated based on the difference between the posture and the position of the gripper 11 at the start point Pr and the posture and the position of the gripper 11 at the target point Pd. In other words, histories of the translation velocity and the rotation velocity are generated based on the distance from the start point Pr to the target point Pd and a predetermined certain velocity. FIG. 7B illustrates exemplary histories of the translation velocities in the X axis direction and the Z axis direction and the rotation velocity around the Z axis. G7 is a history of the translation velocity in the X axis direction, G8 is a history of the translation velocity in the Z axis direction, and G9 is a history of the rotation velocity around the Z axis. The orthogonal velocity commands are generated so that the translation velocity and the rotation velocity are constant except when an operation starts or ends as illustrated in FIG. 7B. The orthogonal velocity commands illustrated in FIG. 7B are converted into the angular velocity commands for the respective rotational joints J1 to J7. For this conversion, a calculation is performed based on the inverse kinematics. FIG. 7C illustrates a result of converting the orthogonal velocity commands into the angular velocity commands. G9 is an angular velocity command applied to the rotational joint J2, G10 is an angular velocity command applied to the rotational joint J3, G11 is an angular velocity command applied to the rotational joint J5, and G12 is an angular velocity command applied to the rotational joint J6.

<Position Setting Unit>

As illustrated in FIG. 5, the position setting unit 19 sets the first intermediate point Pm1 and the second intermediate point Pm2 on the first trajectory T1, and generates coordinate information based on the robot coordinate system C representing the first intermediate point Pm1 and the second intermediate point Pm2. The first intermediate point Pm1 is set for each target work WO using the first trajectory T1, the coordinate information of the target point Pd generated based on the image data, and the shape information of the first stocker 2. The second intermediate point Pm2 is set using the coordinate information of the target point Pd and the information of the approach direction AL included in the picking-up posture data. Further, the position setting unit 19 sets a desired position as the end point Pe, and generates the coordinate information based on the robot coordinate system C representing the end point Pe.

Here, the first intermediate point Pm1 and the second intermediate point Pm2 are points set for each target work WO based on information related to the target work WO and information related to the first stocker 2.

<Trajectory Checking Unit>

There are cases in which an object serving as an obstacle to the picking-up operation is present around the robot R and the target work WO. For example, the sidewall of the first stocker 2 may serves as an object serving as the obstacle to the picking-up operation. The trajectory checking unit 21 determines whether the operation of the gripper 11 according to the first trajectory T1 and the second trajectory T2 is hindered by interference with the obstacle. Here, the trajectory data is specified based on the robot coordinate system C. The first stocker 2 serving as the obstacle is specified as data as well using the robot coordinate system C as the reference coordinates. In this case, since the trajectory and the obstacle are specified in the space of the same robot coordinate system C, it is possible to check the presence or absence of interference using a known calculation method. When there is interference, the trajectory checking unit 21 outputs a command for revising the first trajectory T1 or the second trajectory T2 to the trajectory calculating unit 18.

Further, the trajectory checking unit 21 determines whether an operation according to the trajectory can be performed without exceeding the movable range of the robot R. The movable range is set to each of the rotational joints J1 to J7 of the robot R. A range in which the whole robot R can move is set based on the movable ranges of the rotational joints and the lengths of the links L1 to L5. Further, the movable range of the present embodiment may be a range obtained by adding a safety margin to the range in which the whole robot R can move. Alternatively, the movable range may be a range that is set in view of a singular point of the links L1 to L5 in addition to the movable ranges of the rotational joints J1 to J7. When it is not possible to perform an operation without exceeding the movable range, the trajectory checking unit 21 outputs a command for revising the first trajectory T1 or the second trajectory T2 to the trajectory calculating unit 18.

<Robot Driving Unit>

The first trajectory data and the second trajectory data are input to the robot driving unit 22. The robot driving unit 22 controls a motor included in the robot R based on the first trajectory data and the second trajectory data such that the gripper 11 moves according to the first trajectory T1 and the second trajectory T2, and the posture of the gripper 11 is changed to a certain posture.

Figure 8:
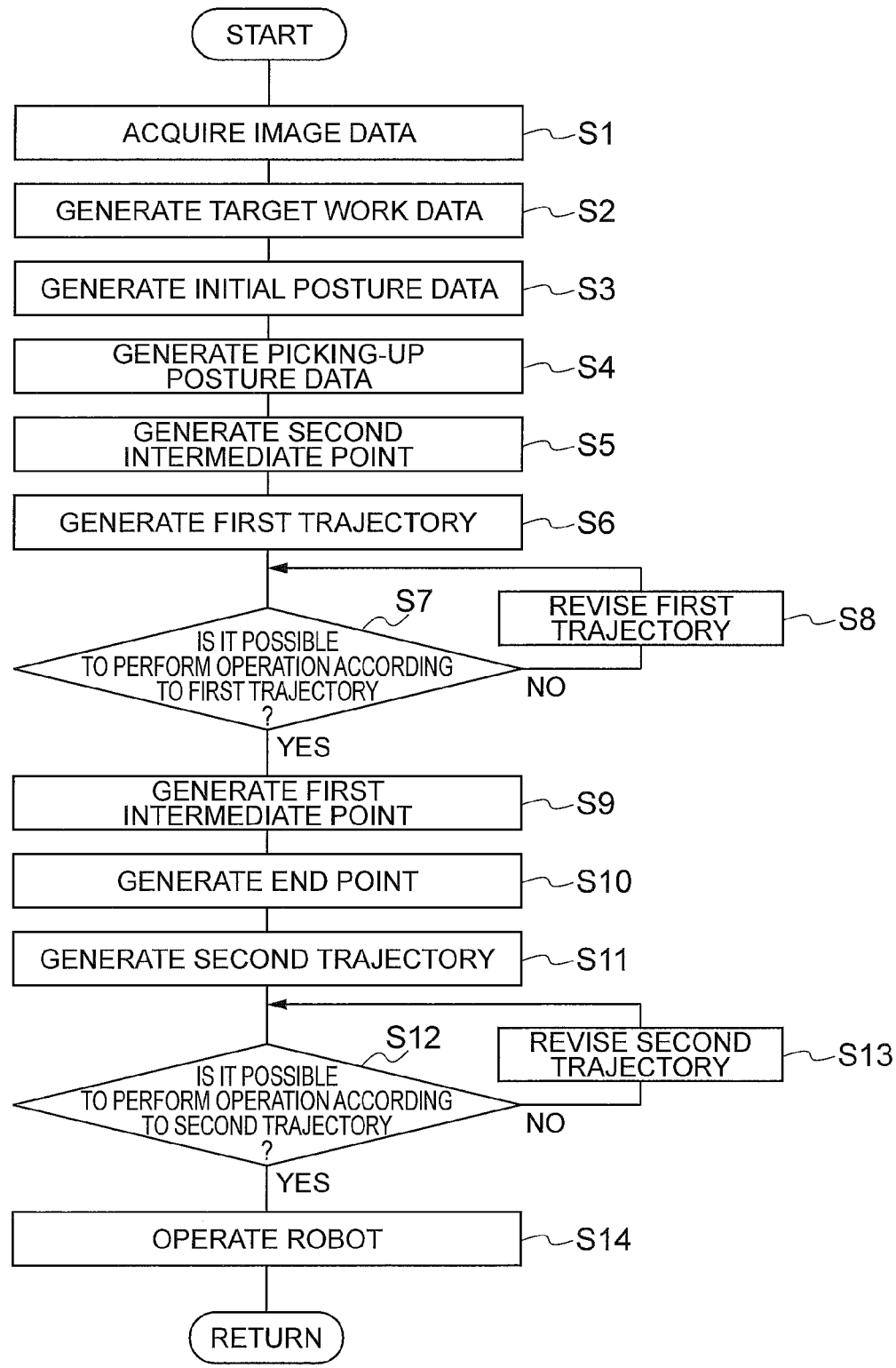
FIG. 8 is a diagram for describing a main process of performing a picking-up operation.

Next, a process of the picking-up operation performed by the robot picking system 1 will be described. FIG. 8 is a diagram for describing a main process of performing the picking-up operation. FIGS. 9A and 9B and FIGS. 10A and 10B are diagrams for describing a process of generating the trajectory.

Figure 9A:
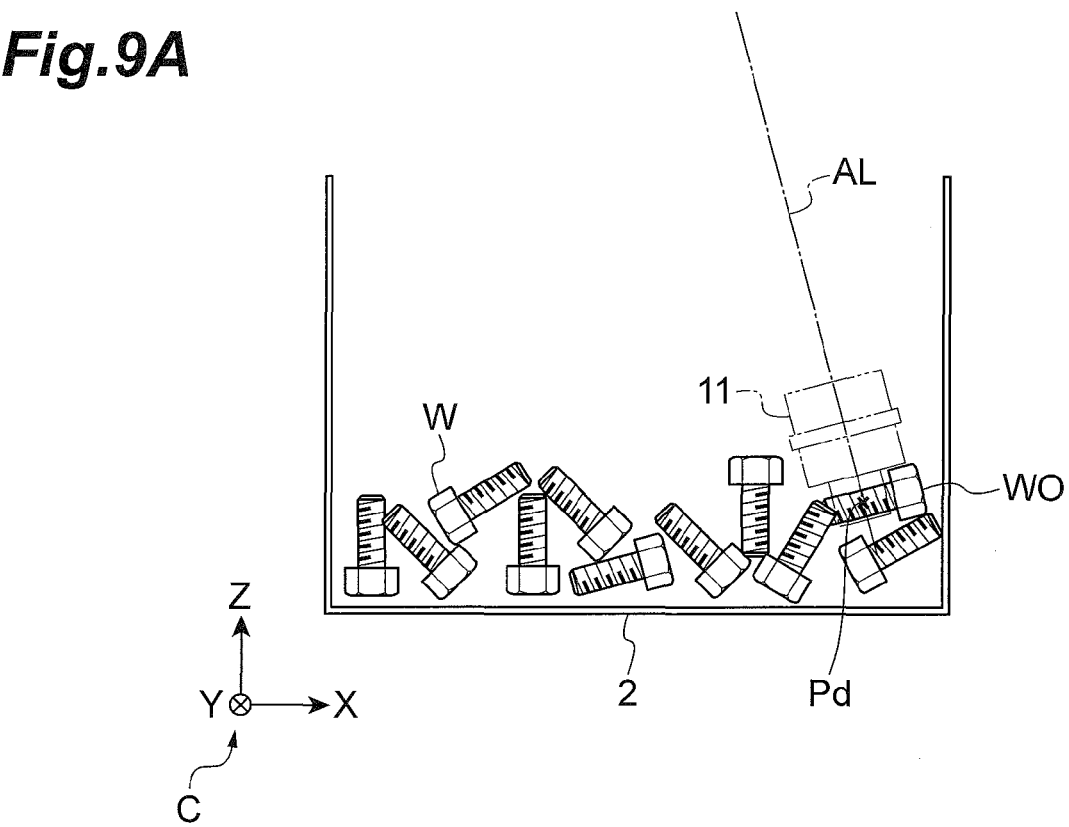
FIGS. 9A and 9B are diagrams for describing a process of generating a trajectory.
Figure 9B:
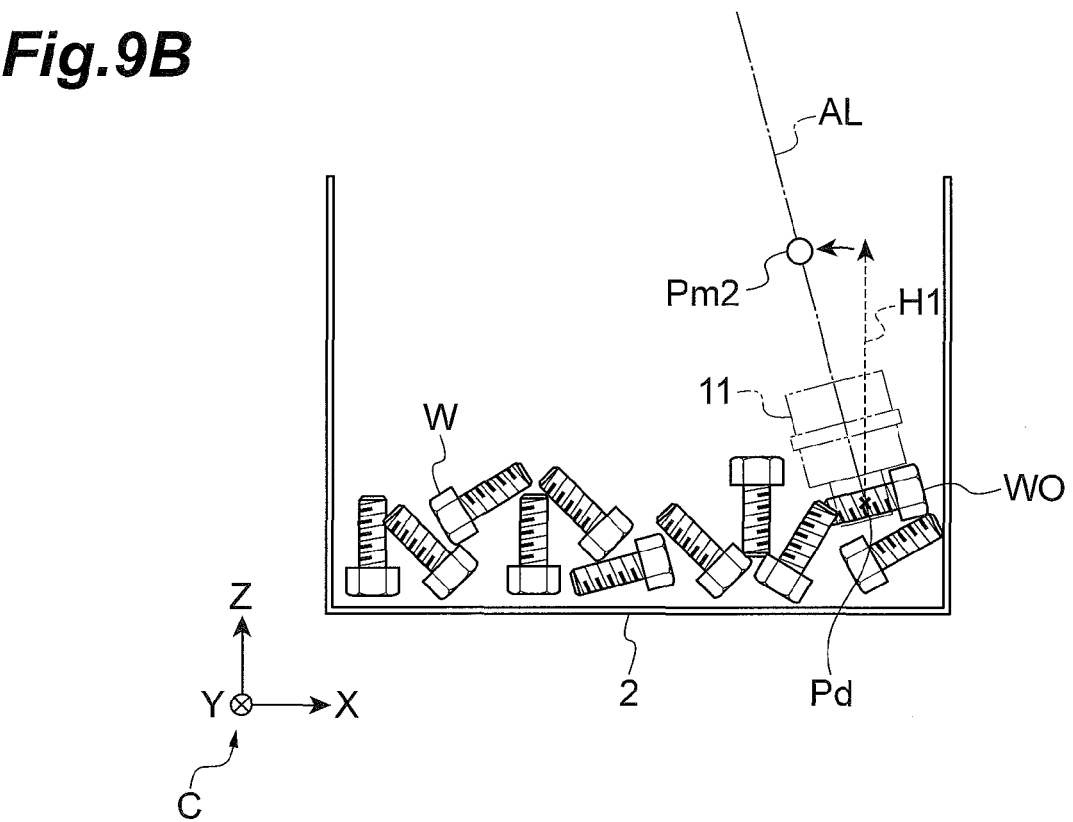

As illustrated in FIG. 8, first of all, the image data of the first stocker 2 is acquired using the image acquiring device 6, and the image data is output to the control device 4 (process S1). Then, the target work data generating unit 14 generates the target work data (process S2). The initial posture data generating unit 13 generates the initial posture data (process S3), and then the picking-up posture data generating unit 16 generates the picking-up posture data (process S4) (see FIG. 9A). In FIG. 9A, the picking-up posture of the gripper 11 is represented by an alternate long and two short dashes line.

Then, the trajectory data generating unit 17 generates the trajectory data. First of all, the position setting unit 19 calculates the coordinate information of the second intermediate point Pm2 (process S5) (see FIG. 9B). Then, the trajectory calculating unit 18 generates a trajectory T3a connecting the start point Pr with the second intermediate point Pm2 and a trajectory T4 connecting the second intermediate point Pm2 with the target point Pd (process S6) (see FIG. 10A).

The trajectory checking unit 21 checks the trajectory T3a generated in process S6, that is, checks whether it is possible to perform an operation according to the first trajectory T1 (process S7). In the example illustrated in FIG. 10A, interference with the first stocker 2 occurs in the trajectory T3a (NO in process S7). Thus, the trajectory calculating unit 18 revises a first zone T3a of the first trajectory T1 to a first zone T3b (process S8). According to the first trajectory T1 including the revised curved line-like first zone T3b and the straight line-like zone T4, interference with the first stocker 2 does not occur (YES in process S7). Thus, in this case, the subsequent process S9 is performed.

Then, the position setting unit 19 sets the first intermediate point Pm1 on the first trajectory T1 (process S9), and sets the end point Pe in the second stocker 3 (process S10). Then, the trajectory calculating unit 18 generates a second trajectory T3 connecting the target point Pd with the end point Pe with the shortest distance (process S11). Then, the trajectory checking unit 21 checks the second trajectory T3 generated in process S11, that is, checks whether it is possible to perform an operation according to the second trajectory T3 (process S12).

Figure 10A:
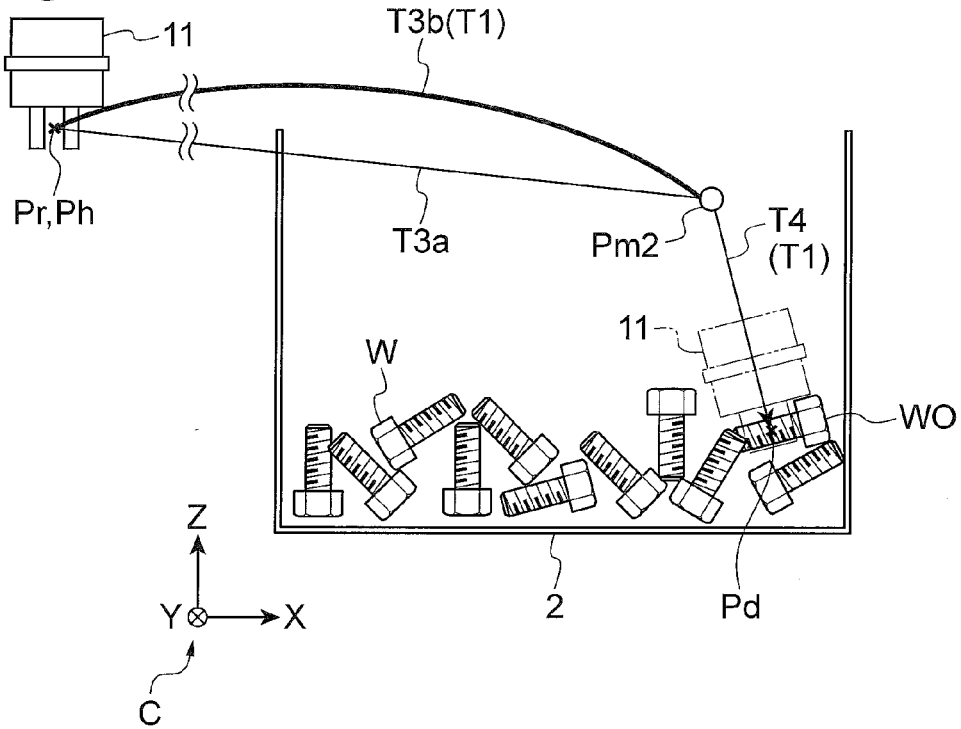
FIGS. 10A and 10B are diagrams for describing a process of generating a trajectory.
Figure 10B:
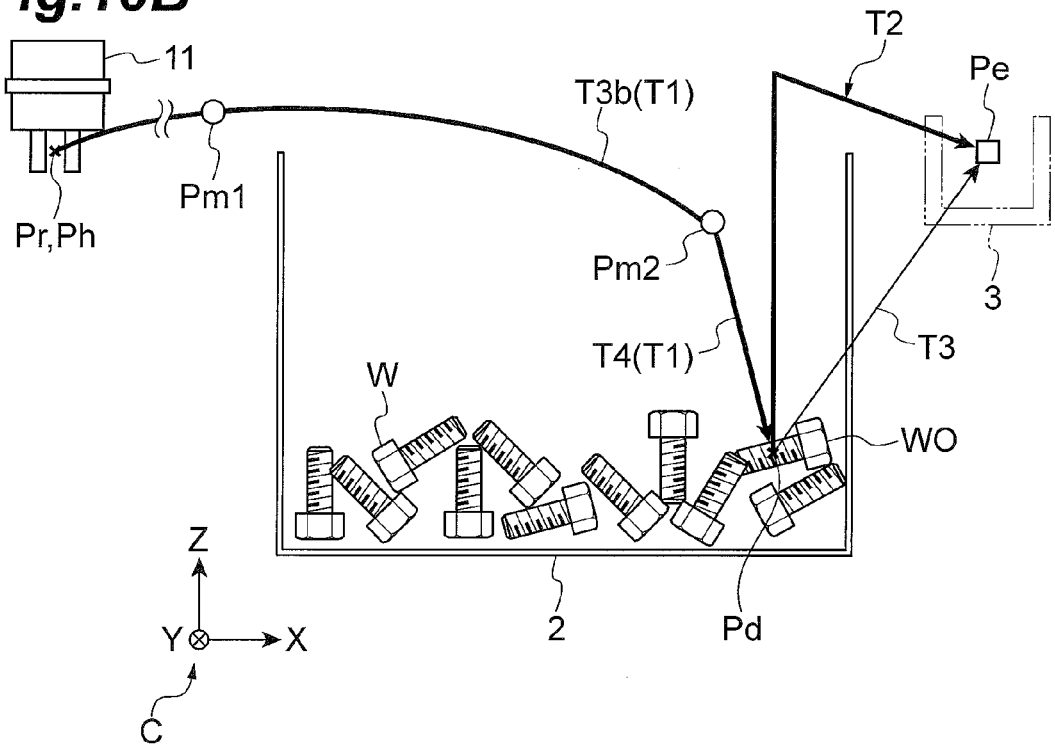

In the example illustrated in FIG. 10B, according to the straight line-like second trajectory T3 connecting the target point Pd with the end point Pe, interference with the first stocker 2 occurs (NO in process S12). Thus, the trajectory calculating unit 18 revises the second trajectory T3 to the second trajectory T2 (process S13). According o the revised second trajectory T2, interference with the first stocker 2 does not occur (YES in process S12). Thus, in this case, the subsequent process S14 is performed. Then, the robot driving unit 22 drives the robot R to perform the picking-up operation (process S14).

Meanwhile, when the posture of the gripper 11 is changed to the picking-up posture after the gripper 11 approaches the target work WO, there are cases in which the gripper 11 comes in contact with the target work WO or the work W near the target work WO. Further, there are cases in which the position or the posture of the target work WO changes due to the contact with the gripper 11. The picking-up posture data is generated based on the position and the posture before the change. For this reason, when the position or the posture of the target work WO changes, the probability of the successful picking-up operation by the gripper 11 is likely to decrease.

However, according to the robot picking system 1 of the present embodiment, the control device 4 calculates the picking-up posture and the approach direction AL. Then, the robot driving unit 22 changes the posture of the gripper 11 to the picking-up posture in the first zone Z1 in which the gripper 11 does not come in contact with the target work WO or the like, and causes the gripper 11 to approach the target work WO according to the approach direction AL in the second zone Z2 while maintaining the picking-up posture. Through this operation, even when the posture of the gripper 11 changes, the position and the posture of the target work WO do not change. Thus, the probability of the successful picking-up operation increases, and it is possible to efficiently take out the target work WO.

Further, there are cases in which in an operation of taking out a work using a robot including a work holding unit, in order to rapidly move the work holding unit while avoiding the work holding unit interfering with a surrounding object, an approach position is set to the trajectory of the work holding unit in advance. According to the operation of taking out a work along the trajectory, the work holding unit has to pass though the approach position, and thus it may be difficult to efficiently take out a work.

In this regard, it is an object of the present disclosure to provide a robot picking system a control device and a method of manufacturing a workpiece, which are capable of efficiently taking out a work. According to the robot picking system of the present disclosure described above, it is possible to efficiently take out a work.

According to the robot picking system 1 of the present embodiment, since the control device 4 includes the trajectory data generating unit 17, it is possible to generate the first trajectory T1. The first trajectory T1 includes the first zone Z1 in which the posture of the gripper 11 is changed from the initial posture to the picking-up posture and the second zone Z2 in which the gripper 11 approaches the target work WO while maintaining the picking-up posture. Thus, since the control of changing the posture is performed separately from the control of causing the gripper 11 to approach the target work WO, it is possible to control the position and the posture of the gripper 11 easily and reliably.

According to the robot picking system 1 of the present embodiment, the control device 4 includes the position setting unit 19, and thus the first zone Z1 in which interference with the first stocker 2 or the like is prevented can be set on the first trajectory T1.

According to the robot picking system 1 of the present embodiment, the control device 4 includes the picking-up posture data generating unit 16. According to the picking-up posture data generating unit 16, it is possible to set the picking-up posture and the approach direction AL according to the state of the target work WO, the probability of success in picking up can be increased. Thus, it is possible to take out the target work WO more efficiently.

According to the robot picking system 1 of the present embodiment, the position setting unit 19 sets the first intermediate point Pm1 to the position at which the length of the first zone Z1 is larger than the length of the second zone Z2. According to this setting, since a sufficient time for changing the posture can be secured, it is possible to easily control the posture of the gripper 11.

Further, the position setting unit 19 sets the first intermediate point Pm1 at the position higher than the target work WO. According to this setting, the posture of the gripper 11 is changed at the position higher than the target work WO. Thus, it is possible to change the posture of the gripper 11 without causing the gripper 11 to come in contact with the work W.

Further, the position setting unit 19 sets the first intermediate point Pm1 outside the first stocker 2. According to this setting, the posture of the gripper 11 is changed outside the first stocker 2. Thus it is possible to change the posture of the gripper 11 without causing the gripper 11 to come in contact with the work W and the first stocker 2.

According to the robot picking system 1 of the present embodiment, different moving routes are set as the first trajectory T1 and the second trajectory T2. Thus, a route appropriate to approach the target work WO can be set as the first trajectory T1, and a route appropriate to take out the target work WO can be set as the second trajectory T2. Thus, it is possible to reduce a required time for movement from the start point Pr to the end point Pe at which the target work WO is released via the target point Pd at which the target work WO is picked up.

According to the robot picking system 1 of the present embodiment, the position setting unit 19 sets the first intermediate point Pm1 and the second intermediate point Pmt which are specific for each target work WO using the information related to the target work WO and information related to the first stocker 2. Thus, the position setting unit 19 can set the first trajectory T1 including the first zone Z1 and the second zone Z2 according to the individual target work WO. Accordingly, since the picking-up condition corresponding to each target work WO can be set, it is possible to efficiently take out the target work WO.

The exemplary embodiment of the present invention has been described above, but the present invention is not limited to the above embodiment, and various changes can be made within the scope not departing from the gist thereof. For example, the image acquiring device 6 may be arranged at an arbitrary position capable of photographing the work W of the first stocker 2 instead of being mounted to the leading end of the arm 8 of the robot R.

Further, in the above embodiment, the method of selecting the target work WO, the method of calculating the trajectory, and the method of checking the presence or absence of interference are exemplary, and not limited to the methods described in the present embodiment.

Further, in the above embodiment, the position setting unit 19 sets the first intermediate point Pm1 using the three conditions, that is, the condition in which the first intermediate point Pm1 is set to the position at which the length of the first zone Z1 is larger than the length of the second zone Z2, the condition in which the first intermediate point Pm1 is set to the position higher than the target work WO, and the condition in which the first intermediate point Pm1 is set outside the first stocker 2. When the position setting unit 19 sets the first intermediate point Pm1, all of the above conditions need not be applied, and one condition or a combination of two or more conditions may be applied.

Further, in the above embodiment, the robot R may be a vertical dual arm robot.

Further, a desired product (workpiece) may be manufactured using the robot picking system 1 described above.

Indeed, the novel devices and methods described herein may be embodied in a variety of other forms; furthermore, various omissions, substitutions and changes in the form of the devices and methods described herein may be made without departing from the spirit of the inventions. The accompanying claims and their equivalents are intended to cover such forms or modification as would fall within the scope and spirit of the inventions.

Certain aspects, advantages, and novel features of the embodiment have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

What is claimed is:

1. A robot picking system, comprising:
   a robot including a picking-up unit that picks up a work in a stocker accommodating a plurality of works;
   a control device that controls an operation of the robot; and
   an image acquiring device that acquires image data including information related to the plurality of works,
   wherein the control device includes a picking-up posture data generating unit that uses the image data to generate a picking-up posture data, and a trajectory data generating unit that uses the picking-up posture data to generate a first trajectory including a first zone in which a posture of the picking-up unit is changed and a second zone in which the picking-up unit having the changed posture approaches a target work that is a picking-up target,
   the picking-up posture data sets a state of the picking-up unit when picking up the target work, and
   the second zone includes a third zone in which the picking-up unit is moved so as to avoid obstacles, and the second zone also includes a fourth zone in which the picking-up unit is moved along an approach direction to a target point at which the target work is gripped.

2. The robot picking system according to claim 1,
   wherein the control device further comprises a position setting unit that sets an intermediate point dividing the first trajectory into the first zone and the second zone on the first trajectory,
   the first zone is a zone extending from an initial position of the picking-up unit to the intermediate point, and
   the second zone is a zone extending from the intermediate point to the target work.

3. The robot picking system according to claim 2,
   wherein, in the first zone, the posture of the picking-up unit is changed from an initial posture for picking up to the picking-up posture.

4. The robot picking system according to claim 2,
   wherein the position setting unit sets the intermediate point to a position at which a length of the first zone is larger than a length of the second zone.

5. The robot picking system according to claim 2,
   wherein the position setting unit sets the intermediate point to a position higher than the target work.

6. The robot picking system according to claim 2,
   wherein the position setting unit sets the intermediate point outside the stocker, and
   wherein the position setting unit uses the picking-up posture data to set a second intermediate point which divides the second zone into the third zone and the fourth zone, a path of the picking-up unit changing at the second intermediate point when the picking-up unit is moved along the approach direction to the target point.

7. The robot picking system according to claim 2,
   wherein the position setting unit further sets an end point of movement when the picking-up unit moves the target work in a picking-up state,
   the trajectory data generating unit generates a second trajectory extending from the target point at which the target work is gripped to the end point, and
   the first trajectory and the second trajectory are different moving routes.

8. A method of manufacturing a workpiece by using the robot picking system defined in claim 1.

9. A robot picking system, comprising:
   a robot including a picking-up unit that picks up a work in a stocker accommodating a plurality of works;
   a control device that controls an operation of the robot; and
   an image acquiring device that acquires image data including information related to the plurality of works,
   wherein the control device uses the image data to generate a picking-up posture data and uses the picking-up posture data to generate a first trajectory including a first zone in which a posture of the picking-up unit is changed and a second zone in which the picking-up unit having the changed posture approaches a target work that is a picking-up target,
   the picking-up posture data sets a state of the picking-up unit when picking up the target work, and the second zone includes a third zone in which the picking-up unit is moved so as to avoid obstacles, and the second zone also includes a fourth zone in which the picking-up unit is moved along an approach direction to a target point at which the target work is gripped.

10. A control device that controls an operation of a robot including a picking-up unit that picks up a work in a stocker accommodating a plurality of works using image data including information related to the plurality of works, the device comprising:
    a picking-up posture generating unit that uses the image data to generate a picking-up posture data; and a trajectory data generating unit that uses the picking-up posture data to generate a first trajectory including a first zone in which a posture of the picking-up unit is changed and a second zone in which the picking-up unit having the changed posture approaches a target work that is a picking-up target, the picking-up posture data sets a state of picking-up unit when picking up the target work, and the second zone includes a third zone in which the picking-up unit is moved so as to avoid obstacles, and the second zone also includes a fourth zone in which the picking-up unit is moved along an approach direction to a target point at which the target work is gripped.

11. The robot picking system according to claim 3, wherein the position setting unit sets the intermediate point to a position at which a length of the first zone is larger than a length of the second zone.

12. The robot picking system according to claim 3, wherein the position setting unit sets the intermediate point to a position higher than the target work.

13. The robot picking system according to claim 4, wherein the position setting unit sets the intermediate point to a position higher than the target work.

14. The robot picking system according to claim 3, wherein the position setting unit sets the intermediate point outside the stocker.

15. The robot picking system according to claim 4, wherein the position setting unit sets the intermediate point outside the stocker.

16. The robot picking system according to claim 5, wherein the position setting unit sets the intermediate point outside the stocker.

17. The robot picking system according to claim 3, wherein the position setting unit further sets an end point of movement when the picking-up unit moves the target work in a picking-up state, the trajectory data generating unit generates a second trajectory extending from the target point at which the target work is gripped to the end point, and the first trajectory and the second trajectory are different moving routes.

18. The robot picking system according to claim 4, wherein the position setting unit further sets an end point of movement when the picking-up unit moves the target work in a picking-up state, the trajectory data generating unit generates a second trajectory extending from the target point at which the target work is gripped to the end point, and the first trajectory and the second trajectory are different moving routes.

19. The robot picking system according to claim 5, wherein the position setting unit further sets an end point of movement when the picking-up unit moves the target work in a picking-up state, the trajectory data generating unit generates a second trajectory extending from the target point at which the target work is gripped to the end point, and the first trajectory and the second trajectory are different moving routes.

20. The robot picking system according to claim 6, wherein the position setting unit further sets an end point of movement when the picking-up unit moves the target work in a picking-up state, the trajectory data generating unit generates a second trajectory extending from the target point at which the target work is gripped to the end point, and the first trajectory and the second trajectory are different moving routes.

\* \* \* \* \*